United States Patent [19]

Ueno et al.

[11] 4,319,968
[45] Mar. 16, 1982

[54] ELECTROLYTICALLY DECOMPOSING METHOD FOR IRON-CYANIDE COMPLEX

[75] Inventors: Atsuyuki Ueno; Junichiro Yokota, both of Tokyo, Japan

[73] Assignee: Katsuhiro Okubo, Tokyo, Japan

[21] Appl. No.: 237,616

[22] Filed: Feb. 24, 1981

Related U.S. Application Data

[63] Continuation of Ser. No. 54,697, Jul. 5, 1979, abandoned.

[51] Int. Cl.³ .............................................. C25B 1/00
[52] U.S. Cl. ..................................... 204/96; 204/103; 204/130; 204/149
[58] Field of Search ............... 204/130, 149, 152, 103, 204/96

[56] References Cited

U.S. PATENT DOCUMENTS

| | | | |
|---|---|---|---|
| 3,645,867 | 2/1972 | Ericson et al. | 204/149 |
| 3,816,275 | 6/1974 | Ichiki et al. | 204/149 |
| 3,933,606 | 1/1976 | Harms | 204/149 |
| 3,970,531 | 7/1976 | Recht | 204/149 |

*Primary Examiner*—R. L. Andrews

[57] ABSTRACT

An electrolytically decomposing method of an iron-cyanide complex which includes the steps of introducing an electrolyte containing the iron-cyanide complex into an electrolytic cell, applying a voltage between the electrodes to electrolytically decompose the iron-cyanade complex and oxidizing cyan to form a cyanic acid while precipitating an iron hydroxide is disclosed. In the method a specific conductivity of the electrolyte is adjusted to not more than 30 m ℧/cm.

6 Claims, 5 Drawing Figures

ELECTROLYTICALLY DECOMPOSING METHOD FOR IRON-CYANIDE COMPLEX

This application is a continuation of Ser. No. 54,697 filed July 5, 1979, now abandoned.

BACKGROUND OF THE INVENTION

This invention relates to a method of electrolytically decomposing an iron-cyanide complex.

Waste water from a carburizing process for iron, plating or printing process, photograph processing or the like contains an iron-cyanide complex, the content of which should be desirably reduced in the waste water from an environmental standpoint.

The iron-cyanide complex, however, is relatively stable and is not conveniently dissociable in an aqueous solution because of low dissociation constant of iron-cyanide complex, for example those for potassium ferricyanide and ferrocyanide in the orders of $\times 10^{-44}$ and $\times 10^{-33}$, respectively. Further, the iron-cyanide complex shall not be decomposed chemically even by addition of a strongly oxidizing agent unless the high temperature is employed for the decomposing reaction.

It has been well known that an addition of alkali to such the aqueous solution to obtain the strong alkalinity enables the ultraviolet-light irradiation to decompose the iron cyanide complex. This decomposing reaction, however, needs a considerable energy with an oxidizing agent as an additive to decompose the liberated cyan, resulting in a complicated and high cost process.

Further, it has been proposed to utilize the sun light in place of the ultraviolet-light in order to reduce the cost. At present, however, the decomposing method of this type is not practical for a diluted solution because of its low efficiency and more time-consuming.

On the other hand, it has already been experienced that a heavy metal salt in a plating solution could be electrolyzed for recovery of the metal. An attempt to utilize this electrolytic method for the decomposition of the iron-cyanide complex and the oxidization of the liberated cyan into a cyanic acid, however, could not provide a practical method because of extremely low efficiency in the decomposition.

It has now been found out that in the method of electrolytically decomposing an iron-cyanide complex, an oxidative decomposition does not substantially develop if the specific conductivity ($\kappa$) of the electrolyte exceeds about 30 m℧/cm, whereas the decomposing reaction may occur more easily as the specific conductivity ($\kappa$) decreases below the above upper limit.

SUMMARY OF THE INVENTION

A general object of the invention is therefore to provide an electrolytic treatment of waste water containing an iron-cyanide complex for efficient decomposition thereof to produce a harmless waste water.

In accordance with the invention there is provided a method of electrolytically decomposing an iron-cyanide complex which comprises introducing an electrolyte containing said iron-cyanide complex into an electrolytic cell including an anode and a cathode, applying a voltage between the electrodes to electrolytically decompose said iron-cyanide complex and oxidizing a cyan to form a cyanic acid while causing precipitation of an iron in the form of hydroxide, wherein a specific conductivity of the electrolyte is adjusted to not more than 30 m℧/cm.

It has been found that the specific conductivity of the electrolyte ($\kappa$) of not more than 30 m℧/cm, preferably not more than 25 m℧/cm, according to the invention has a close relationship with the anodic current density ($D_A$) in function. For the practice of the invention, the anodic current density ($D_A$) may be optionally selected but perferably be in the range of 1 to 6 A/dm$^2$.

For more fully understanding of the invention, the preferred example is described in detail below with reference to the accompanying drawings in which:

DESCRIPTION OF THE PREFERRED EXAMPLE

Figure 1:
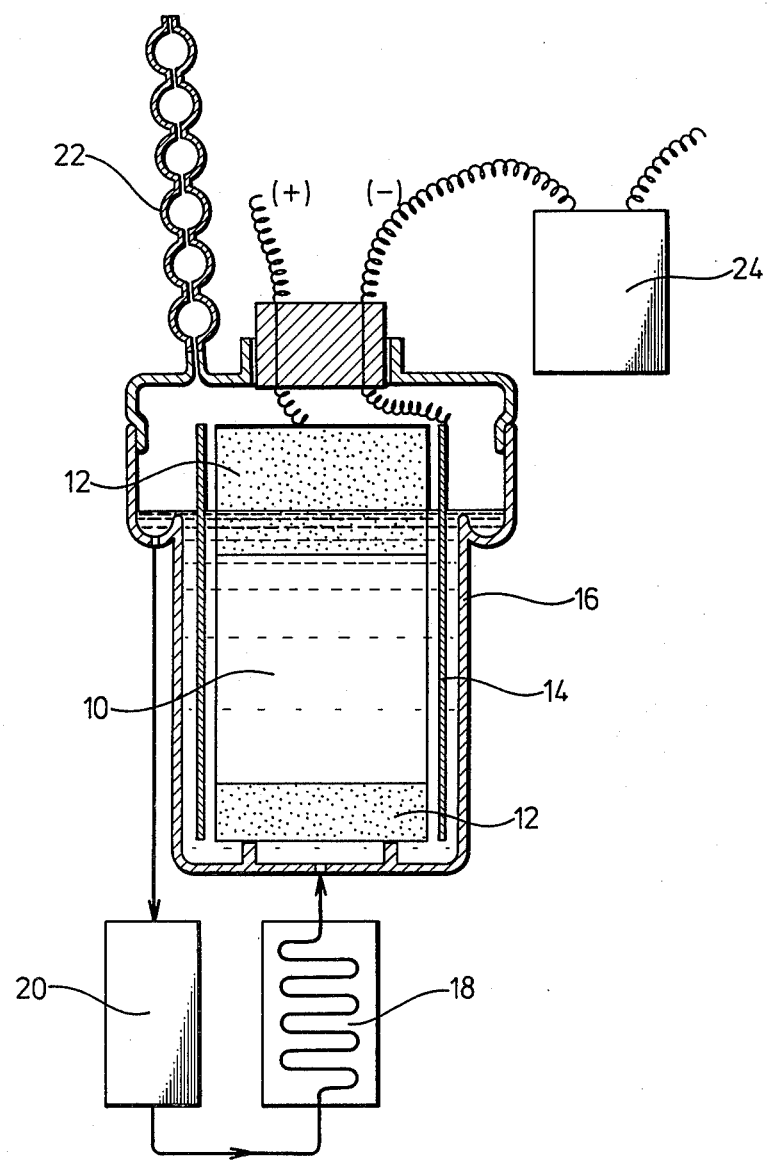
FIG. 1 is a longitudinally sectioned view of the apparatus for carrying out the method according to the invention.

An apparatus used in the example is illustrated in FIG. 1.

As an anode 10 is employed an electrolytic graphite of 31 mm diameter, a part of which is coated with epoxy resin 12 whereas a titanium net is employed as a cathode 14. These anode 10 and cathode 14 are arranged in an electrolytic cell 16 with a distance of approximately 8–9 mm. A volume of the electrolytic cell is approximately 100 cm$^3$. About 125 ml of electrolyte which has been previously adjusted to a predetermined temperature in a constant temperature bath 18 is fed through a roller pump 20 into a bottom of the cylindrical glass electrolytic cell 16 at a flow rate of 80 ml/min. for continuous circulation in an overflow system. Then, a voltage of approximately 4–10 volts is applied between the electrodes to control the anodic current density, the quantity of electricity and the bath temperature in a manner as hereinafter fully described. A produced gas from the electrode was discharged through a condenser 22 to minimize a quantity of water evaporated and loss of the electrolyzate. As an electrolyte is used an aqueous solution of potassium ferricyanide containing 100 mg/l of iron and 280 mg/l of cyan. The specific conductivity ($\kappa$) of the electrolyte is adjusted to approximately 5, 10, 15, 20 and 30 m℧/cm at 25° C. respectively with addition of a convenient quantity of sodium carbonate. The pH of each electrolyte is in the range of 11.0 to 11.4. The total cyan concentrations of the electrolyte and the treated solution are determined in accordance with JIS K-D 102, and the iron concentrations were determined in accordance with the atomic absorption method.

The bath temperature of approximately 25° C., the anodic current density ($D_A$) of approximately 3A/dm$^2$ and the quantity of electricity of 2Ah are preferably employed, and each electrolyte, the specific conductivity of the electrolyte is varied in the range of from 5 to 30 m℧/cm as hereinbefore described. The electrolyte is supplied to the electrolytic cell. After electrolysis for determination of the total cyan and iron concentrations, the results of which is shown in FIG. 2 in which an abscissa is the specific conductivity $\kappa$(m℧/cm) of the electrolyte whereas an ordinate is the total cyan and iron concentrations (mg/l) after electrolysis are taken place.

Figure 2:
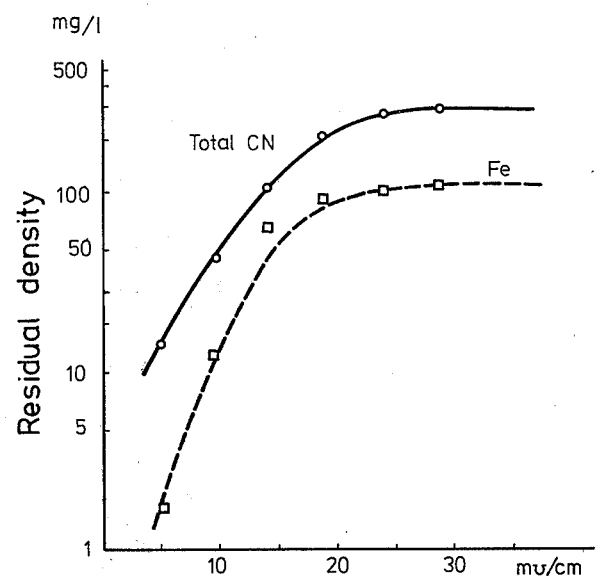
FIG. 2 is a diagram showing a relationship between the specific conductivity of the electrolyte and the total cyan and iron concentrations after electrolysis.
Figure 3:
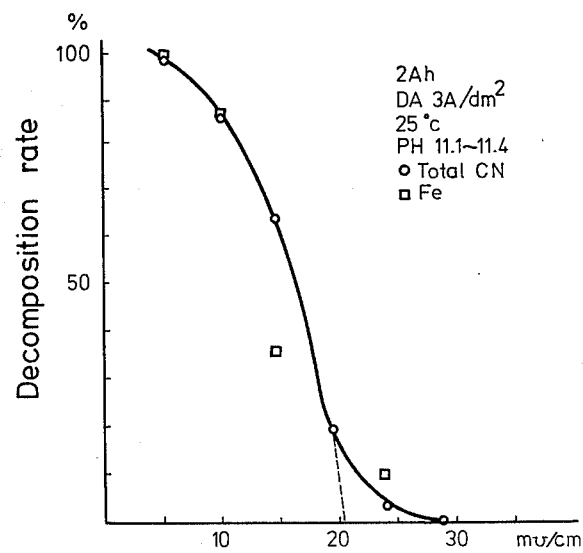
FIG. 3 is a diagram showing a relationship between the specific conductivity of the electrolyte calculated from values of FIG. 2 and the oxidative decomposition rate of cyan.

As will be appreciated from FIG. 2, when the specific conductivity is above 30 m℧/cm, the total cyan and iron concentrations after electrolysis are kept at the same level as those before electrolysis. On the other hand, when the specific conductivity $\kappa$ is not more than 30 m℧/cm, the residual total cyan and iron concentrations decrease as the $\kappa$ value decreases. The oxidative decomposition rates (%) (residual concentration/original concentration) of cyan and iron are calculated from the values shown in FIG. 2, the results of which are shown in FIG. 3. The abscissa shows the specific conductivity $\kappa$ (m℧/cm) of the electrolyte while the ordinate shows the oxidative decomposition rate (%). The result of FIG. 3 and the observation of the yellowish-brown precipitates of ferric (III) hydroxide during the electrolysis endorses the fact that the iron-cyanide complex could be effectively decomposed under the condition of the specific conductivity of not more than 30 m℧/cm.

Figure 4:
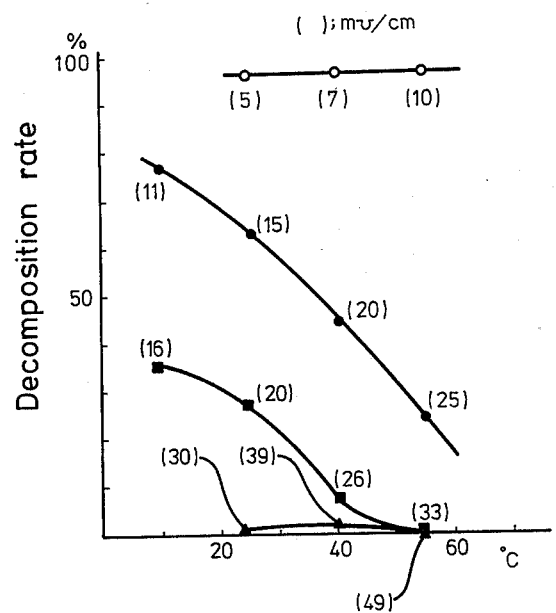
FIG. 4 is a diagram showing a relationship between the bath temperature and the oxidative decomposition rate of cyan.

The anodic current density ($D_A$) and the quantity of electricity are adjusted to approximately 3A/dm² and 2Ah respectively and the specific conductivity $\kappa$ is varied 5, 15, 20 and 30 m℧/cm at 25° C., as hereinbefore described, while the bath temperature is varied in the range of approximately 10° to 55° C. in order to observe the influences of these factors exerting on the oxidative decomposition rate. The result is shown in FIG. 4 in which the bath temperature (° C.) is taken on an abscissa whereas the oxidative decomposition rate (%) of cyan is taken on an ordinate and the value in parenthesis show the specific conductivity $\kappa$ (m℧/cm). When the electrolyte has the specific conductivity $\kappa$ of 5 m℧/cm at 25° C. as shown by the symbol of "——○——" in FIG. 4, the oxidative decomposition rate of cyan is relatively high. This high level is kept constant even when the bath temperature is increased to 55° C. As the specific conductivity $\kappa$ at 25° C. of the electrolyte is increased to 15 m℧/cm as shown by "——⊛——", 20 m℧/cm as shown by "——■——" and 30 m℧/cm as shown by "——▲——", however, the bath temperature brings more strong effect on the exodative decomposition rate. Namely, as the bath temperature increases the value $\kappa$ increases with decrease of the oxidative decomposition rate. Accordingly, it will be appreciated that the oxidative decomposition rate of cyan may be improved as the specific conductivity decreases below 30 m℧/cm.

Figure 5:
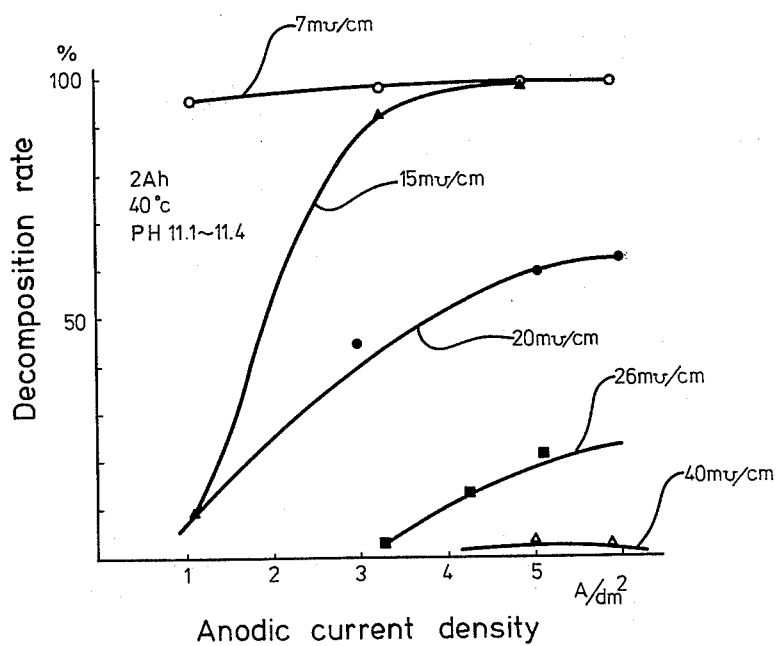
FIG. 5 is a diagram showing a relationship between the anodic current density and the oxidative decomposition rate of cyan.

The bath temperature and the quantity of electricity are adjusted to 40° C. and 2 Ah respectively, and further the anodic current density ($D_A$) is varied in the range of 1 to 6 A/dm² with respect to the electrolytes having the $\kappa$ values of 7, 15, 20 and 26 m℧/cm in order to observe the relationship between the specific conductivity $\kappa$ and the anodic current density ($D_A$). The result is shown in FIG. 5 wherein the anodic current density (A/dm²) is taken on an abscissa and the oxidative decomposition rate (%) of cyan is taken on an ordinate. Where the electrolyte has a low $\kappa$ value of 7 m℧/cm at 40° C. as shown by "——○——" in FIG. 5, the oxidative decomposition rate of cyan is still maintained at a high and constant level even despite of variation of the anodic current density $D_A$ in the range hereinbefore described. FIG. 5 also shows the fact that as the specific conductivity $\kappa$ (40° C.) increases to 15 m℧/cm as shown by "——●——", 20 m℧/cm as shown by "——▲——" and 26 m℧/cm as shown by "——□——", the oxidative decomposition is difficult to proceed unless the anodic current density ($D_A$) becomes high. It will be appreciated that the lower the specific conductivity is below 30 m℧/cm, the higher the decomposition rate of iron-cyanide complex becomes even when the anodic current density ($D_A$) is held low.

Without further elaboration, the foregoing will so fully illustrate the invention that others may, by applying the current or future knowledge, readily adapt the same for use under various conditions of service.

What is claimed is:

1. A method for electrolytically decomposing iron-cyanide complexes comprising the steps of providing an electrolytic cell having a non-ferrous anode and a cathode, introducing into said electrolytic cell an electrolyte having a specific conductivity within the range of 5–25 m℧/cm. and containing said iron-cyanide complex, applying a voltage between said electrodes to electrolytically decompose said iron-cyanide complex, while maintaining the specific conductivity of said electrolyte within said range, and oxidizing the cyan released thereby to form a cyanic-acid, and precipitating the iron ions released thereby in the form of hydroxide.

2. The method according to claim 1 wherein the anode is graphite.

3. The method according to claim 2 wherein the cathode is titanium.

4. The method according to claim 1 or 2 including the step of maintaining the electrolyte at constant temperature.

5. The method according to claim 1 or 2 including the step of maintaining the anode at a constant current density.

6. The method according to claim 1 or 2 including the step of circulating said electrolyte to and from electrolytic cell in a continuous flow.

* * * * *